G. W. WICKS.
MANUFACTURE OF WATER-TRAPS.

No. 169,392. Patented Nov. 2, 1875.

Witnesses:
D. P. Cowl
Jno. D. Patten

Inventor:
Geo. W. Wicks
pr Geo. W. Ramny atty

UNITED STATES PATENT OFFICE.

GEORGE W. WICKS, OF NEW YORK, N. Y.

IMPROVEMENT IN THE MANUFACTURE OF WATER-TRAPS.

Specification forming part of Letters Patent No. 169,392, dated November 2, 1875; application filed April 22, 1875.

*To all whom it may concern:*

Be it known that I, GEO. W. WICKS, of the city, county, and State of New York, have invented an Improved Method of Making Water-Traps for Water-Closets and similar purposes, the object of which is to supply a superior and cheaper article than has heretofore been furnished, all of which is clearly and fully set forth in the following description, including the accompanying drawings and letters of reference thereon.

Figure 3:
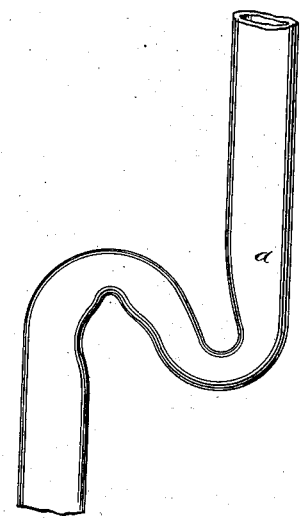
Figure 4:
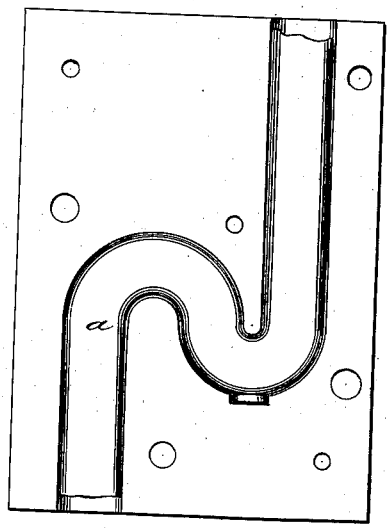
Figure 1:
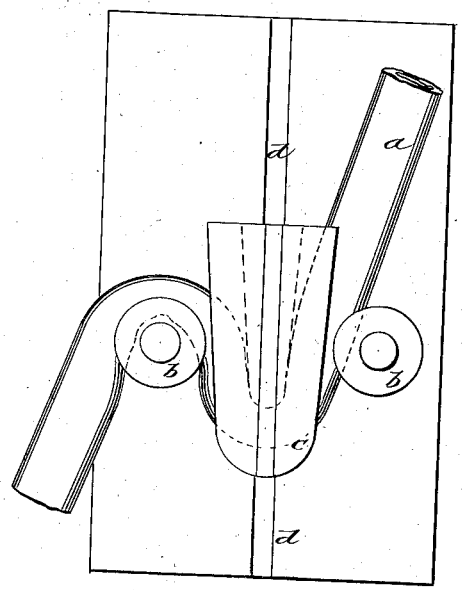
Figure 2:
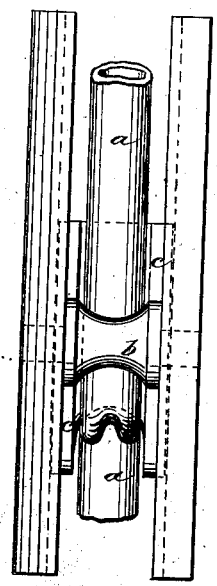

Figure 1 is a top view of a die in which the lead pipe *a* has been bent between the two rollers *b b*, by forcing the forming-wedge *c* in the line of *d d*. An edge view of the same is seen in Fig 2, and the crudely-bent trap thus formed is seen in Fig. 3. Fig. 4 represents a metallic die, made in bilateral halves, with a recess intervening between.

In this die represented in Fig. 4 the roughly-formed trap, as seen in Fig. 3, is placed, and the two bilateral halves, constituting the die, are firmly secured together by screw-bolts or otherwise; and one end of the pipe *a* is stopped with a water-tight plug, and in the other end of the pipe the nozzle of a hydrostatic force-pump is inserted, and water or other fluid is forced into the pipe *a*, which causes the pipe *a* to take the exact form of the die.

In the first step of the process it is only necessary to select a soft metallic tube of any desired diameter and length, and placing it lengthwise across rollers *b b*. The wedge *c* is forced against the pipe, carrying it between the rollers *b b* a sufficient distance to make the first bend; then the wedge and pipe are withdrawn, and the pipe is reversed in its position across the rollers *b b*, and the second and reverse bend is made in the same way as the first.

This mode of constructing water-traps produces an article superior to cast traps, which are always porous to some extent, and is superior to those made in halves and united by soldering, which is often imperfect.

What I claim is—

The within-described method of forming water-traps, which consists in first bending a soft-metal tube into the approximate shape in dies, and, second, opening said bent tube against the walls of a surrounding die by the pressure of a fluid, applied within the tube, to give it the final form, as set forth.

GEO. W. WICKS.

Witnesses:
GEO. M. RAMSAY,
JOHN R. NELSON.